United States Patent
Woodard et al.

(10) Patent No.: US 11,157,675 B2
(45) Date of Patent: Oct. 26, 2021

(54) METHOD AND APPARATUS FOR AUTOMATIC EXTRACTION OF STANDARD CELLS TO GENERATE A STANDARD CELL CANDIDATE LIBRARY

(71) Applicant: University of Florida Research Foundation, Incorporated, Gainesville, FL (US)

(72) Inventors: Damon Woodard, Newberry, FL (US); Domenic J. Forte, Gainesville, FL (US); Ronald Wilson, Gainesville, FL (US); Navid Asadizanjani, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 16/927,195

(22) Filed: Jul. 13, 2020

(65) Prior Publication Data

US 2021/0034805 A1 Feb. 4, 2021

Related U.S. Application Data

(60) Provisional application No. 62/880,291, filed on Jul. 30, 2019.

(51) Int. Cl.
*G06F 30/392* (2020.01)
*G06T 7/00* (2017.01)

(52) U.S. Cl.
CPC .......... *G06F 30/392* (2020.01); *G06T 7/0004* (2013.01); *G06T 2207/10061* (2013.01); *G06T 2207/30148* (2013.01)

(58) Field of Classification Search
CPC ................. G06F 30/392; G06T 7/0004; G06T 2207/10061; G06T 2207/30148
See application file for complete search history.

*Primary Examiner* — Jack Chiang
*Assistant Examiner* — Aric Lin
(74) *Attorney, Agent, or Firm* — Alston & Bird LLP

(57) ABSTRACT

Methods and apparatus are provided for automatically extracting standard cells to form a standard cell library using raw multi-layer images of an IC. Accordingly, various embodiments involve: extracting the raw contact layer image from the raw multi-layer images; binarizing the raw contact layer image to generate a binarized contact layer image identifying a plurality of contact rows and a plurality of contact columns; determining a plurality of $V_{cc}$ lines based on a subset of the plurality of contact rows having a periodic nature; extracting a plurality of binarized contact layer image strips from the binarized contact layer image; encoding each binarized contact layer image strip using feature vectors and column distance values; applying a model rule set to each encoded binarized contact layer image strip for detecting cell boundaries; extracting the standard cells based on the cell boundaries; and storing the extracted cells to form a standard cell candidate library.

21 Claims, 17 Drawing Sheets

METHOD AND APPARATUS FOR AUTOMATIC EXTRACTION OF STANDARD CELLS TO GENERATE A STANDARD CELL CANDIDATE LIBRARY

CROSS-REFERENCE TO RELATED APPLICATIONS

This application claims the benefit of U.S. Provisional Patent Application Ser. No. 62/880,291, filed Jul. 30, 2019, which is incorporated herein by reference in its entirety, including any figures, tables, and drawings.

TECHNICAL FIELD

The present application relates to an approach to automatic extraction of standard cells to generate a standard cell library for reverse engineering (RE) and hardware assurance.

BACKGROUND

RE is the in-depth analysis of an end product to reveal its original functionality and the techniques involved in its manufacturing. The RE information is exploited in several ways ranging from re-manufacturing of legacy devices to defending Intellectual Property (IP) rights. In case of semiconductor integrated circuits (ICs), the RE process requires three major steps, including identifying the device technology from images of the IC chip taken layer-by-layer using scanning electron microscope (SEM), extracting its gate-level netlist, and inferring its functionality based on the extracted gate-level netlist. The first step of the RE process involves taking SEM images of the IC layer-by-layer to recover the node technology employed in its design and obtain a heuristic on design rules that are used to produce the IC. The second step involves matching the design patterns found in the SEM images of the active layer, the poly-silicon (PO) layer, the contact layer, and the metal 1 layer to a standard cell library, and extracting the gate-level netlist based on the matching. This second step also involves examination of the remaining metal layers which show how the cells are connected to each other in the design. The final step involves inferring the functionality of the circuit or a sub-circuit in the IC design. There are many algorithms and automated tools that may assist in the identification and extraction of logic design elements in the IC. The RE step involving gate design requires the SEM images of the active layer, the contact layer, and the metal 1 layer of the IC, while the RE step that involves inferring cell functionality typically only requires the metal 1 layer SEM image of the IC.

Even though the RE paradigm is relatively straight forward and simple, there are several limitations that makes the RE process hard to execute. One of the limitations is the requirement of a template standard cell library or a candidate standard cell library to be present for extracting the gates, fillers, and flip-flops in the netlist. Existing algorithms and tools require some heuristic on the standard cell library to work. With the goal of RE being the extraction of information on the end product with no prior knowledge of the design, this limitation is counterintuitive.

There are several problems associated with the extraction of standard cells from a given device, including image acquisition, alignment and stitching, intra-cell similarity, scale, etc. Some of the problems are illustrated below.

Image Acquisition: In some layers, especially the PO layer, the noise intensity is too high. FIG. 1 is an example raw PO layer SEM image 100 with high noise intensity. This problem can only be counteracted by increasing the quality of the scan. In a typical imaging modality, like a SEM, a higher quality scan can extend the imaging time frame in the scale of several days or even months for advanced technology nodes.

Alignment and Stitching: Due to the nature of the imaging modalities used and the scale at which images are acquired (mosaicking), the images of the layers may be misaligned.

Intra-cell Similarity: In some standard cell libraries (e.g., 90 nm dataset standard cell library), the complexity of cells extracted from raw SEM images assures accurate results of traditional discriminatory machine learning algorithms for identifying different cells in those standard cell libraries. However, in some standard cell libraries (e.g., 32 nm dataset standard cell library), there are extensive similarities between two different standard cells. This inherent similarity can cause traditional machine learning algorithms to produce inaccurate results. FIG. 2 illustrates examples of raw PO layer SEM images showing cell similarity between cell (a) 210 and cell (b) 220 in one standard cell library (e.g., the 32 nm dataset standard cell library), and cell complexity of cell (c) 230 in another standard cell library (e.g., the 90 nm dataset standard cell library).

Scale: With ever increasing levels of integration in IC, the memory and time complexity involved in processing the amount of data extracted from one IC is nearly intractable. This holds true, especially, when each potential cell pattern has to be compared against all the standard cells in the library.

Some existing systems and approaches may address some of the above standard cell extraction issues through cell boundary detection using the contact layer of the IC. One of the major steps in the extraction of logic cells from the contact layer is the detection of the cell boundary between two cells. Typically, this can be done by considering the amount of free silicon substrate between the columns of contacts. If the space occupied by the silicon substrate is greater than a certain threshold, then the contact can be considered as belonging to two different cells. However, there are two major flaws to this line of thought. Firstly, some cells have unusually long spaces between adjacent contact columns and splitting them would cause over-segmentation in the cell. Secondly, this approach, being well known, has prompted the development of several anti-RE methods. For example, one of the anti-RE methods is the insertion of dummy but operational structures into these empty silicon substrate locations. This makes cell boundary detection solely based at least in part on the separation between contact columns virtually impossible.

In light of the above, various methods and apparatuses are disclosed herein to extract standard cells to form a standard cell candidate library for RE of an IC, which requires no prior knowledge of the design of the IC and improves cell boundary detection between two cells. Systems structured in accordance with various embodiments of the present disclosure overcome challenges faced by existing systems by way of utilizing a feature vector encoding mechanism and a set of model rules to analyze the extracted contact layer image for cell boundary detection. Standard cells then can be extracted from raw images to form a standard cell library without prior knowledge of the IC design. As such, systems structured in accordance with various embodiments of the present disclosure provide specific, technical solutions to technical problems faced by existing systems, the details of which are described hereinafter.

BRIEF SUMMARY

In general, embodiments of the present disclosure provide methods, apparatus, systems, and/or the like for extracting one or more standard cells of an integrated circuit (IC) using raw multi-layered images of the IC acquired using an imaging modality. For example, the raw multi-layered images may have been acquired using a scanning electron microscope. In various embodiments, a raw contact layer image is extracted from the raw multi-layered images and binarized to generate a binarized contact layer image displaying a plurality of contacts forming a plurality of contact rows and a plurality of contact columns. Here, each contact represents an electronic connection between a metal layer and one of a poly-silicon layer or an active layer of the IC.

A plurality of common collector supply voltage ($V_{cc}$) lines are determined in various embodiments based at least in part on a contact row subset of the plurality of contact rows, in which each contact row of the contact row subset has a periodic nature of contacts and each two adjacent contact rows has a constant distance representing a cell height. Accordingly, a plurality of binarized contact layer image strips are extracted from the binarized contact layer image based at least in part on the plurality of $V_{cc}$ lines and the cell height.

A plurality of feature vectors is generated for each of the binarized contact layer image strips with each feature vector being generated for a respective contact column located on the binarized contact layer image strip and including elements representing distances between contacts of the respective contact column and a closest $V_{cc}$ line associated with the binarized contact layer image strip. In addition, a plurality of column distance values are determined with each column distance value representing a distance between each two adjacent contact columns located on the binarized contact layer image strip. At this point, cell boundaries are determined in various embodiments based at least in part on the plurality of feature vectors, the plurality of column distance values, and a model rule set and the one or more standard cells are extracted based at least in part on the cell boundaries.

In particular embodiments, these extracted standards cells may be stored in a standard cell candidate library. In addition, one or more of the extracted standard cells may be compared with one or more standard cells stored in the standard cell candidate library and segmented into a combination of the standard cells stored in the standard cell candidate library in response to the one or more extracted standard cells can be represented by the combination.

In some embodiments, the raw contact layer image may be binarized to generate the binarized contact layer image by determining a pixel intensity value for each pixel of the raw contact layer image and removing the respective pixel from the raw contact layer image in response to the pixel intensity value being less than a pixel intensity threshold. While in some embodiments, the plurality of $V_{cc}$ lines may be determined by computing a median value for each contact row of the plurality of contact rows based at least in part on distances between two adjacent contacts located on the contact row, determining a minimum value among each of the median values associated with the plurality of contact rows, generating the contact row subset based at least in part on selecting contact rows in which the median value for each of the selected contact rows is equal to the minimum value, and determining the plurality of $V_{cc}$ lines based at least in part on the contact row subset. Finally, in some embodiments, the model rule set may include at least one of an inter-contact distance rule associated with determining cell boundaries based at least in part on comparing the plurality of column distance values to a constant column distance value and a start-end rule associated with determining cell boundaries based at least in part on ignoring or flagging partial cells detected near the determined cell boundaries.

BRIEF DESCRIPTION OF THE DRAWINGS

Figure 1:
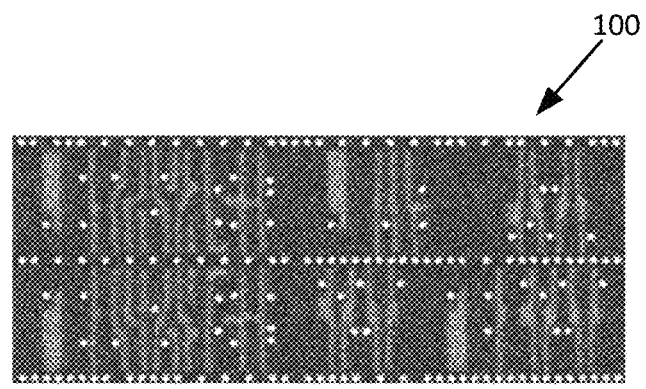
Figure 2:
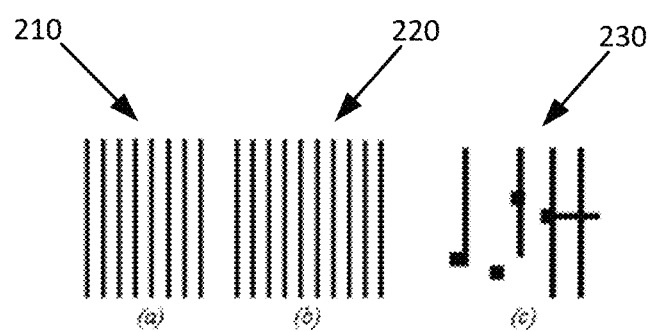
Figure 3:
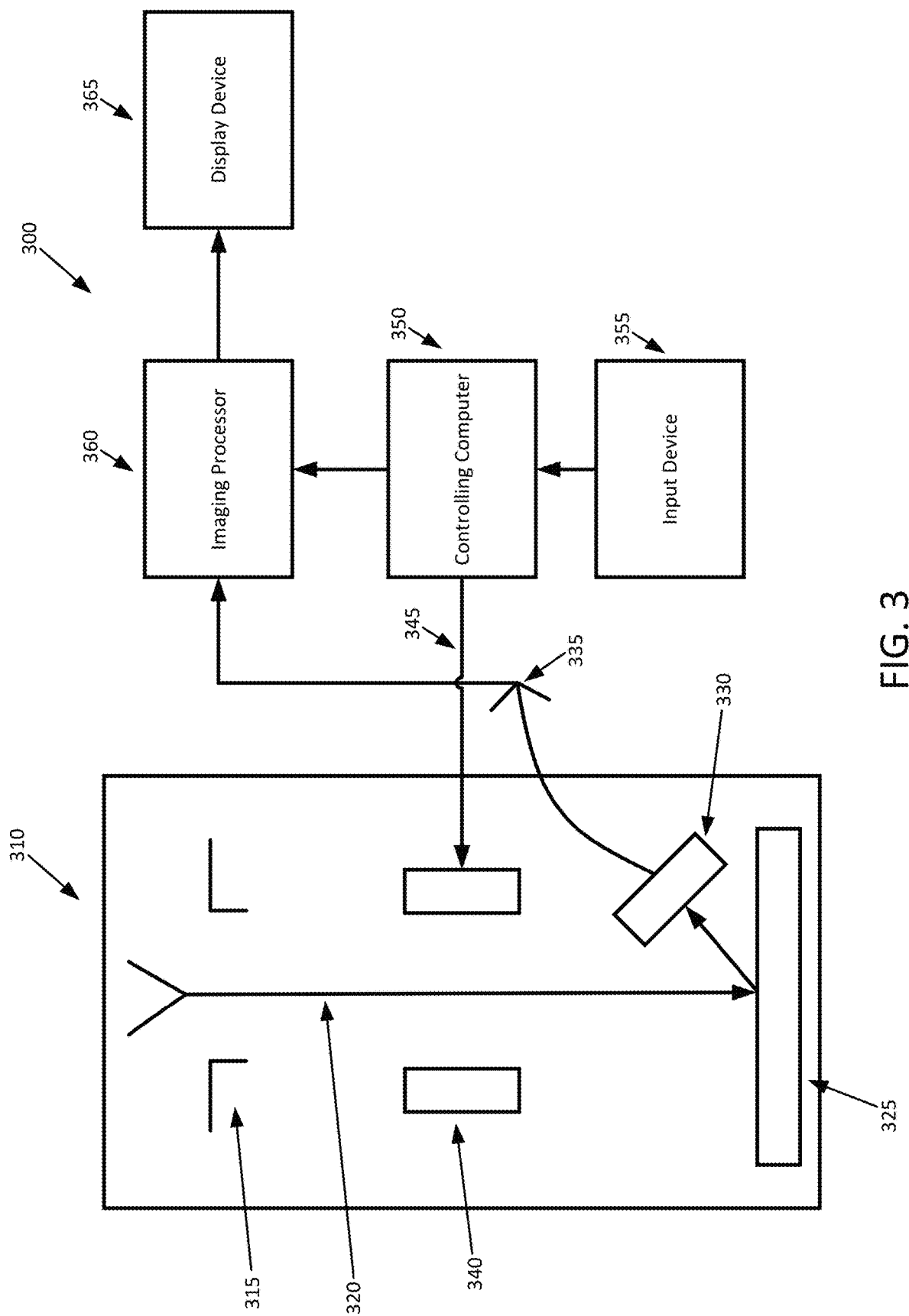
Figure 4:
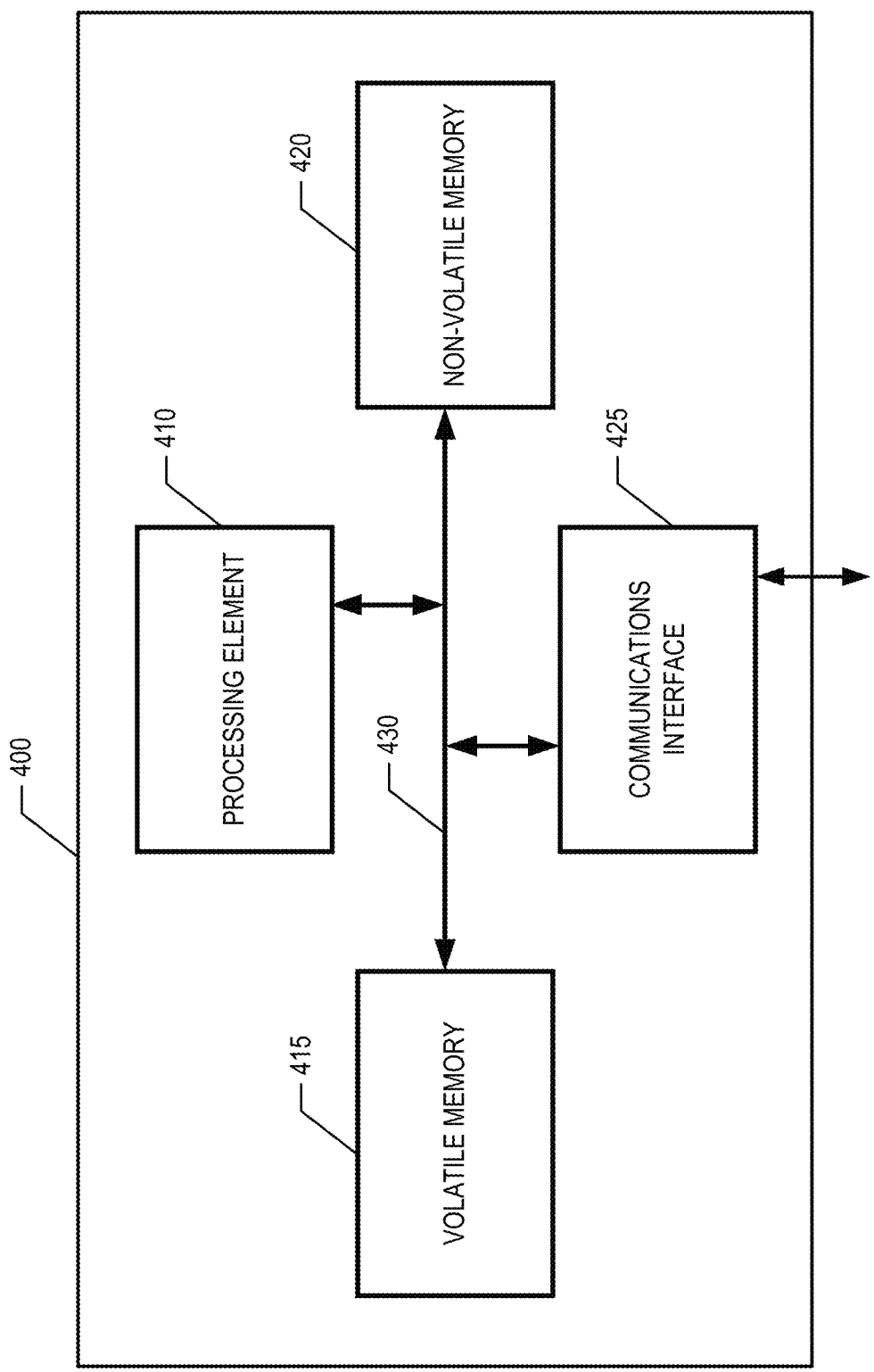
Figure 5:
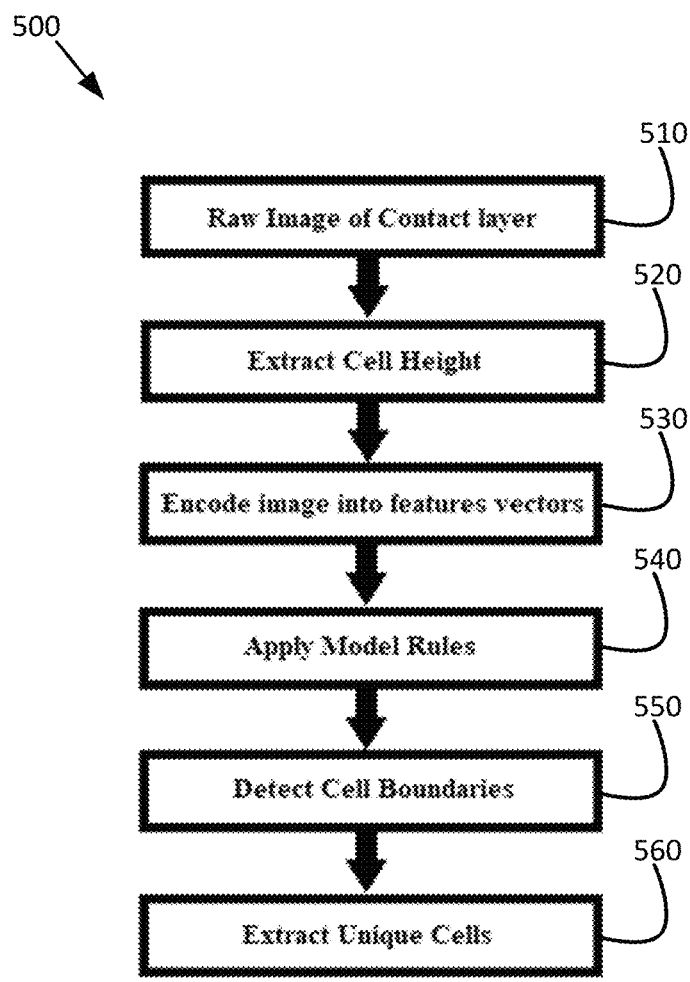
Figure 6:
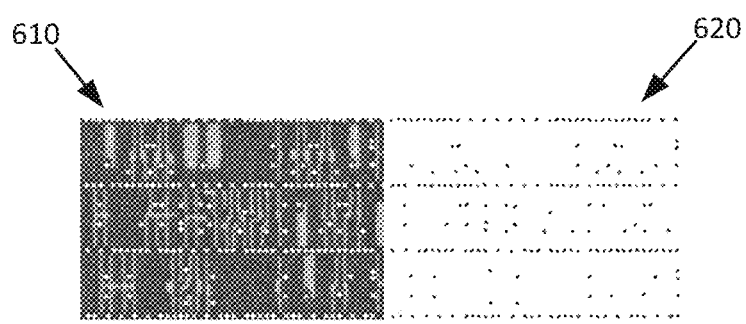
Figure 7:
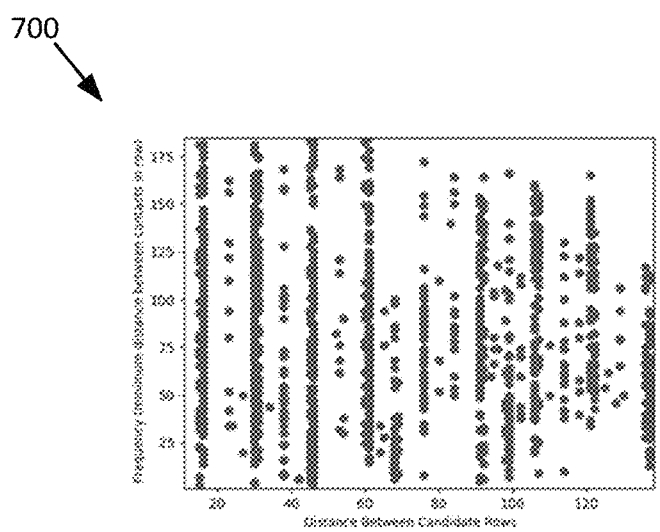
Figure 8:
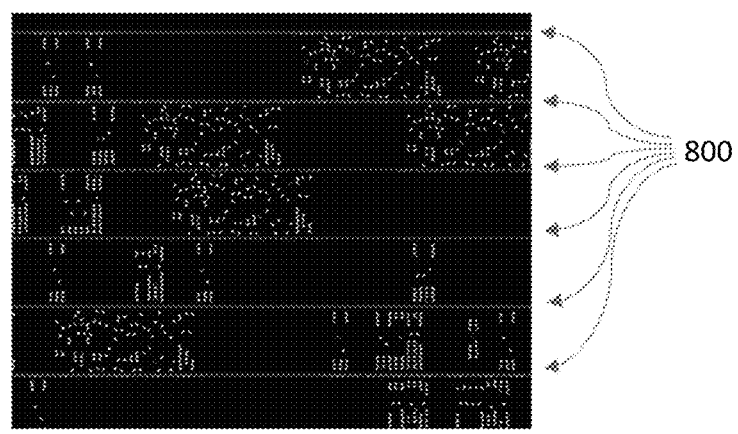
Figure 9:
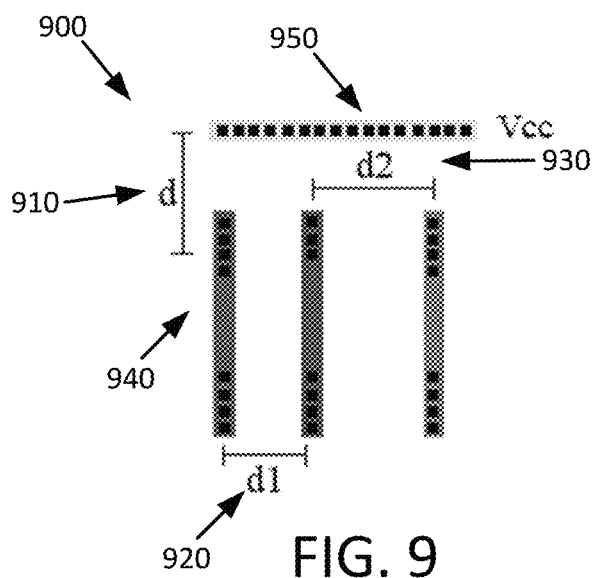
Figure 10:
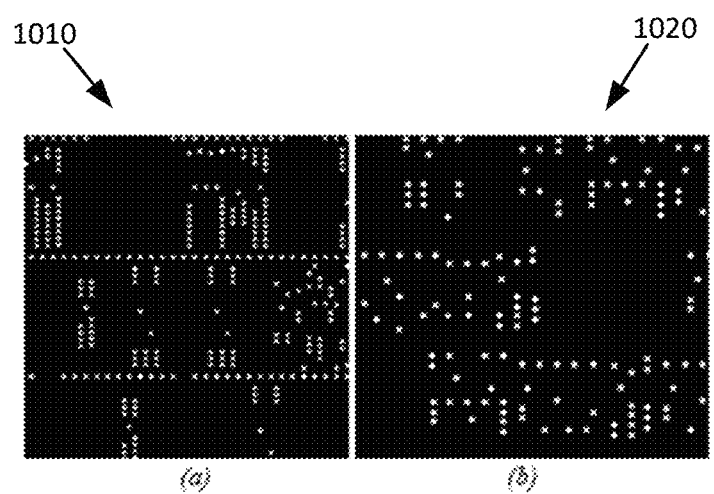
Figure 11:
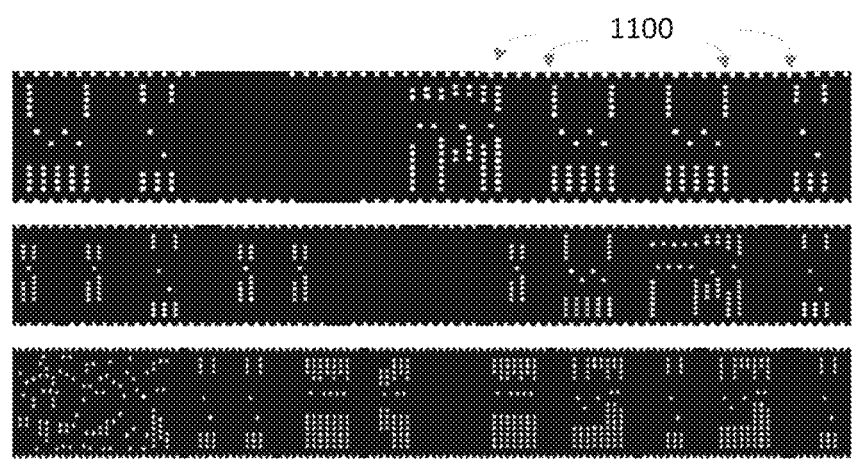
Figure 12:
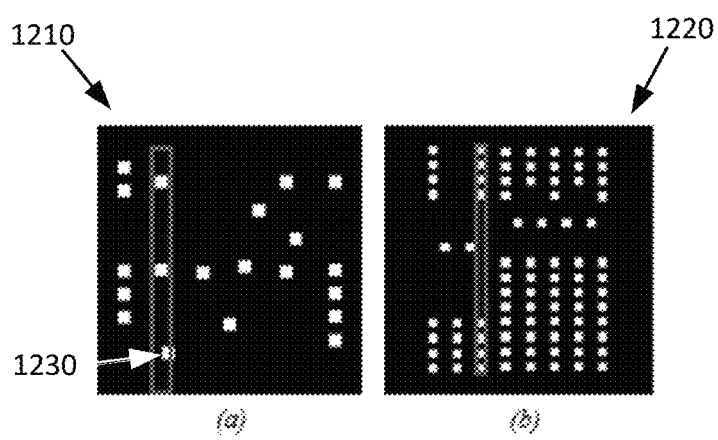
Figure 13:
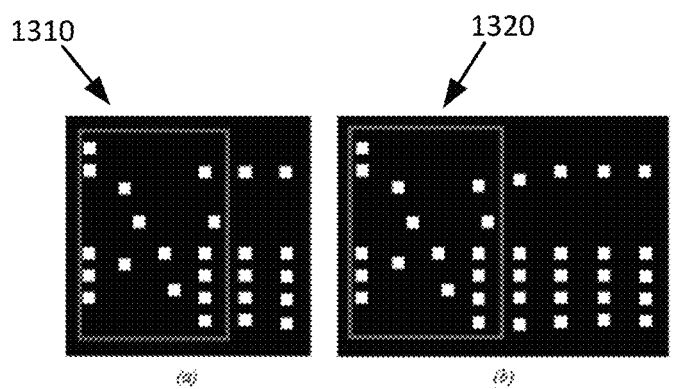
Figure 14:
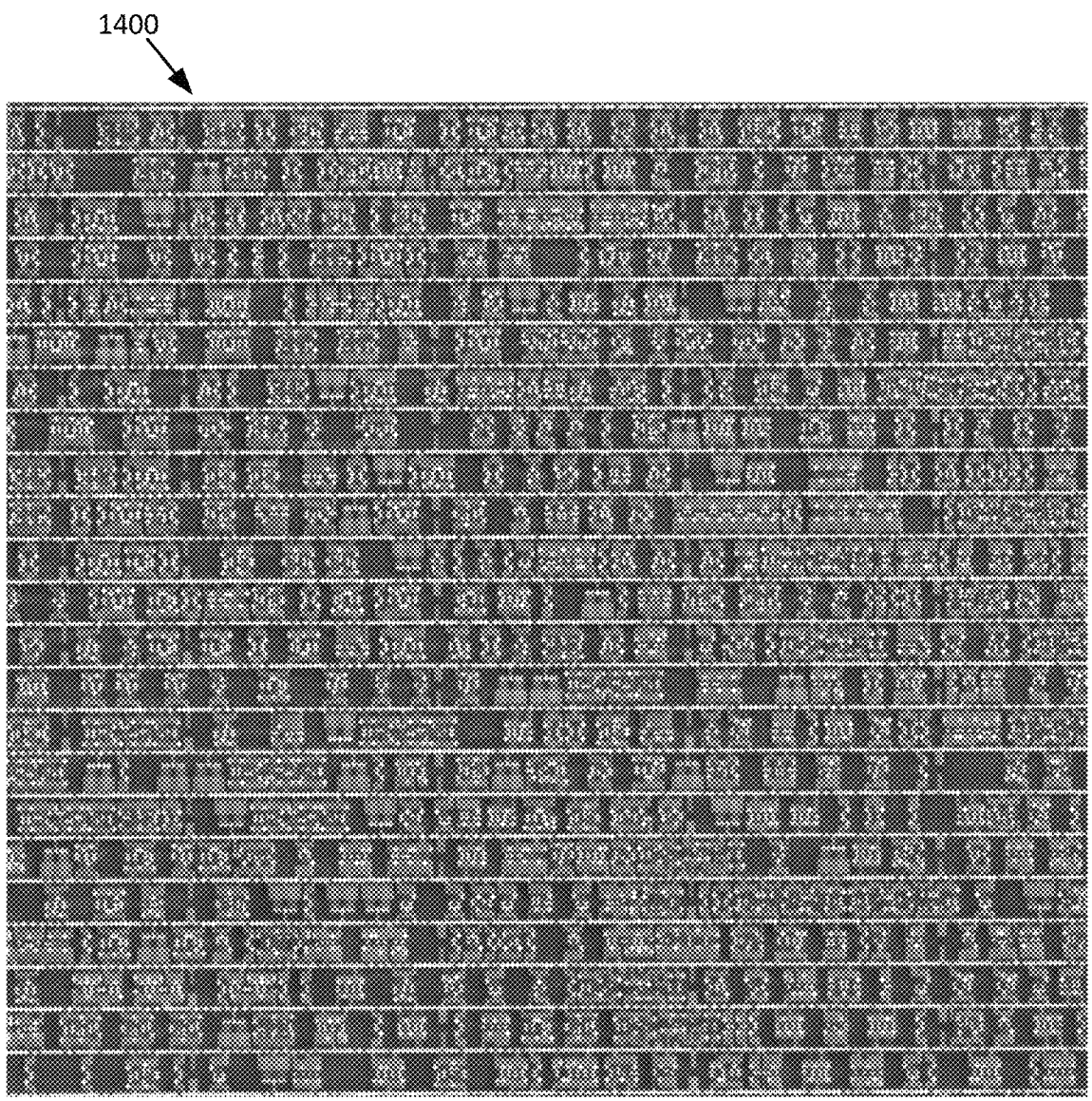
Figure 15:
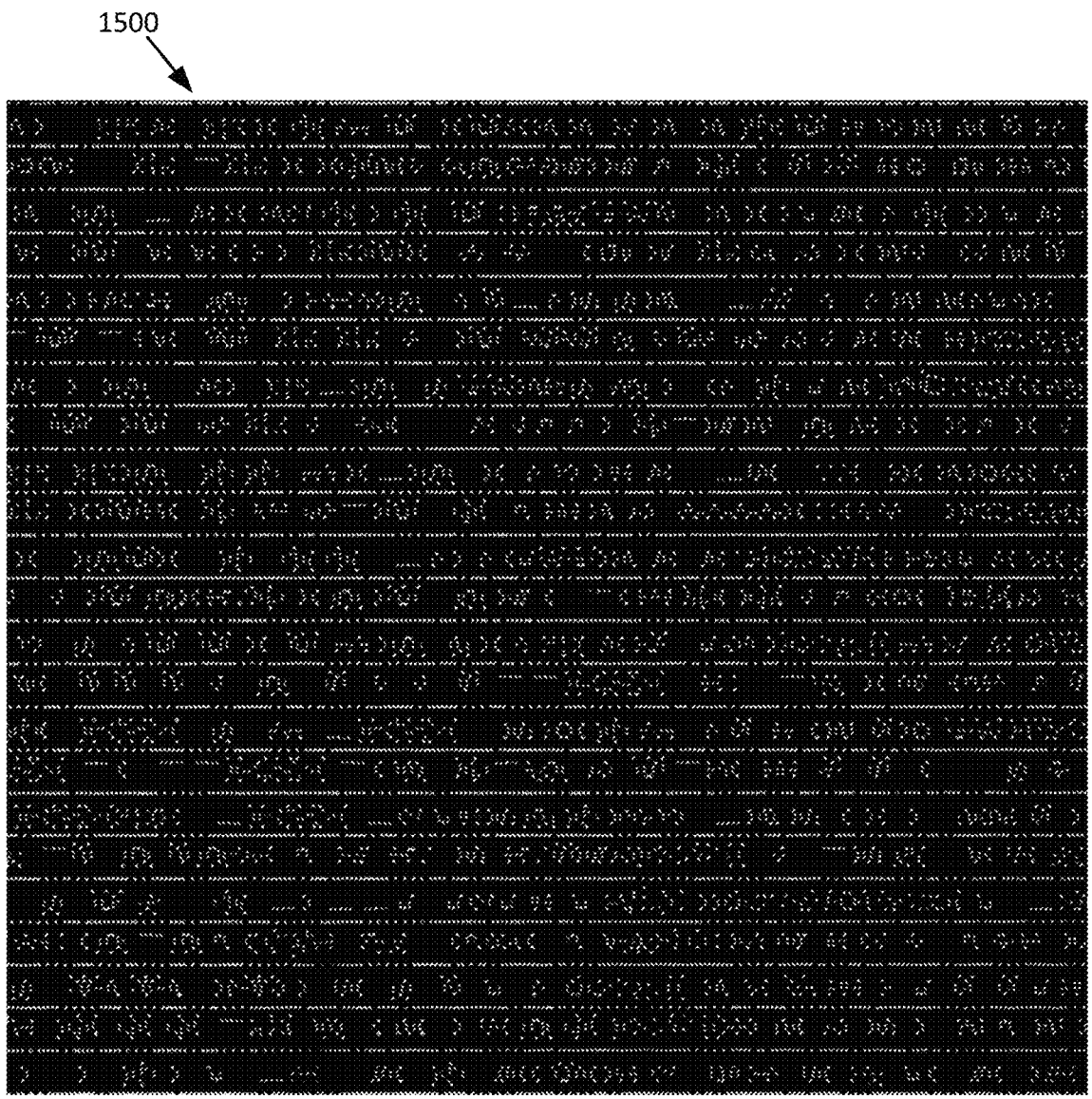
Figure 16:
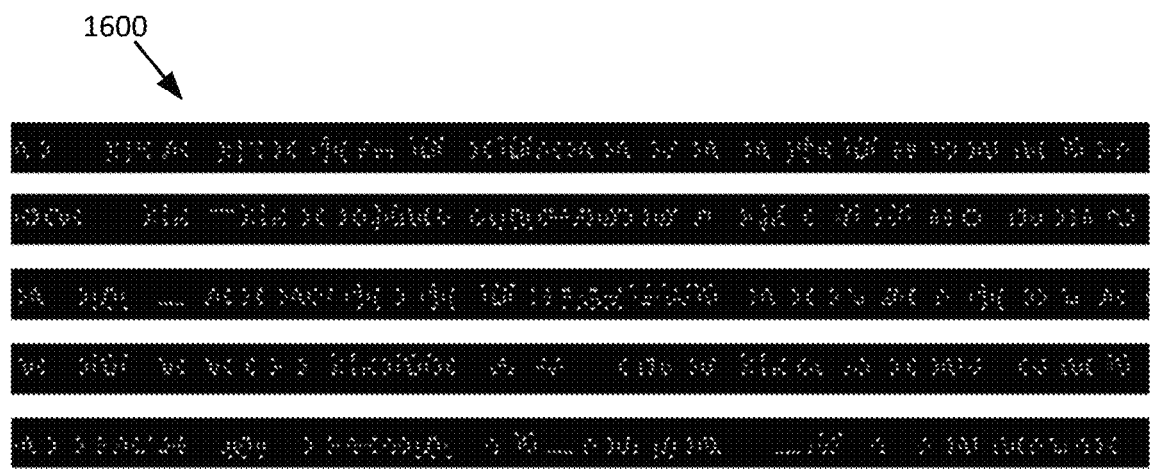
Figure 17:
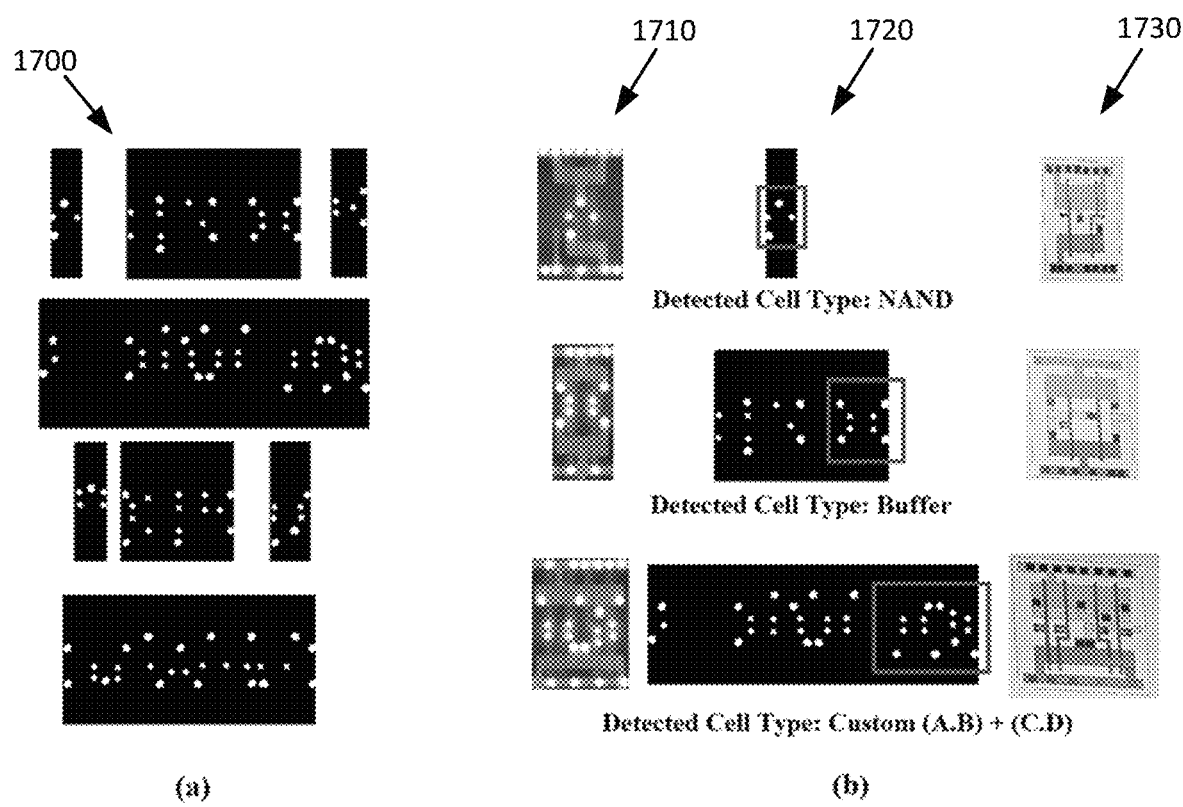

Having thus described the invention in general terms, reference will now be made to the accompanying drawings, which are not necessarily drawn to scale, and wherein:

FIG. 1 illustrates an example of a raw PO layer SEM image with high noise intensity;

FIG. 2 illustrates examples of raw PO layer SEM images showing cell similarity between cells in one standard cell library, and cell complexity of a cell in another standard cell library;

FIG. 3 is a schematic of a scanning electron microscope system that may be used in accordance with various embodiments of the present disclosure;

FIG. 4 is a schematic of a computing entity that may be used in accordance with various embodiments of the present disclosure;

FIG. 5 provides a process flow for extracting standard cells to form a standard cell candidate library in accordance with various embodiments of the present disclosure;

FIG. 6 illustrates an example of binarizing an extracted raw contact layer SEM image to form a binarized raw contact layer SEM image in accordance with various embodiments of the present disclosure;

FIG. 7 illustrates an example plot illustrating a periodic feature of contacts associated with $V_{cc}$ contact lines, FIG. 8 illustrates an example binarized raw contact layer SEM image with determined $V_{cc}$ lines generated in accordance with various embodiments of the present disclosure;

FIG. 9 illustrates an example of encoding a binarized raw contact layer SEM image into feature vectors in accordance with various embodiments of the present disclosure;

FIG. 10 illustrates examples of binarized PO layer SEM images extracted from the 32 nm dataset and the 90 nm dataset;

FIG. 11 illustrates standard cells extracted in accordance with various embodiments of the present disclosure;

FIG. 12 illustrates examples of a non-grid-like allocation of contacts in the 90 nm dataset and a grid-like allocation of contacts in the 32 nm dataset;

FIG. 13 illustrates an example of a failed match result due to over-segmentation;

FIG. 14 illustrates an example raw contact layer SEM image acquired at high potential (12 kV) with window size of 100 μm and dwelling time of 32 μs/pixel;

FIG. 15 illustrates an example binarized contact layer SEM image using a thresholding method in accordance with various embodiments of the present disclosure;

FIG. 16 illustrates a plurality of binarized contact layer SEM image strips generated in accordance with various embodiments of the present disclosure; and FIG. 17 illustrates a plurality of standard cells with different cell types extracted from the raw contact layer SEM image in accordance with various embodiments of the present disclosure.

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

General Overview of Various Embodiments

Various embodiments of the present disclosure resolve an identified problem in the field of RE and hardware assurance, that being the extraction of standard cell libraries from raw images of an IC. Typically, algorithms that fit into the RE paradigm assume the availability of the standard cell libraries for extraction of logic gates and overall logic of the IC. This assumption holds true for the manufacturers and affiliates that have access to the library with prior knowledge of the IC design, however, this assumption fails for commercial off-the-shelf components where no prior information about the IC is available. As a result, the assumption limits the extent to which an effective RE can be performed.

Accordingly, various embodiments provide a process for automatically extracting standard cells to form a standard cell candidate library using raw multi-layered images of an IC. Specifically, embodiments involve extraction of the library using information only from the contact layer due to the fact that features in the contact layer are considerably more resistant to noise than other layers. In addition, embodiments involve using local landmarks, such as common collector supply voltage ($V_{cc}$) lines, from a single image for extracting features to resolve alignment problems in image mosaics. Thus, with the limited possible combination of contacts in the layer and the encoding of images into the feature space, the number of features extracted in various embodiments is exponentially lower than the number of gates in the IC, resulting in effectively reduced memory and time complexity in extracting the standard cells. Further, various embodiments are automated and do not require any prior knowledge on the design rules of the target IC. For particular embodiments, the only human interaction required is to confirm the validity of the extracted cells. Thus, biases and incorrect annotation introduced by human factors may be removed by automating the standard cell extraction process.

The details of various embodiments of the present disclosure are now set forth in the description and the accompanying drawings below. Other features, aspects, and advantages of the subject matter will become apparent from the description, the drawings, and the claims.

Computer Program Products, Systems, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary Scanning Electron Microscopy System

Although various embodiments of the invention may be carried out with respect to different types of imaging modalities, the remaining disclosure it discussed with respect to using various embodiments on images produced in a Scanning Electron Microscopy (SEM) environment. A SEM environment is used to illustrate these embodiments and to help facilitate the reader's understanding of the embodiments. Thus, it should be understood that embodiments of the disclosure provided herein may be used along with other imaging modalities and the discussion of various embodiments involving an SEM environment does not limit the scope of the invention.

Turning now to FIG. 3, this figure provides a schematic configuration of a SEM system 300 that can be used in accordance with various embodiments of the present disclosure. The body 310 of the SEM microscope includes an electron gun 315 through which an electron beam 320 is emitted and converged by an electron lens (not shown and irradiated on a sample 325. An electron detector 330 detects the intensity of secondary electrons generated from the surface of the sample 325 or intensity of reflected electrons by electron beam irradiation. Accordingly, an amplifier 335 amplifies the electron beam 320 and a deflector 340 deflects the beam 320, subjecting the beam 320 to raster scanning on the sample surface according to a control signal 345 provided by a controlling computer 350. Here, the control signal 345 indicates parameters for performing the scanning of the sample 325. One or more input devices 355 such as a keyboard and/or a mouse may be connected to the controlling computer 350. A signal outputted from the amplifier 335 is converted from analog to digital inside an imaging processor 360 to generate digital image data. Accordingly, a display device 365 may be used to view the image data. Moreover, the imaging processor 360 may include memory for storing the digital image data and may perform various imaging processes and display controls.

Exemplary Computing Entity

FIG. 4 provides a schematic of a computing entity 400 that may be used in accordance with various embodiments of the present invention. For instance, the computing entity 400 may be the controlling computer 350 or imaging processor 360 found within the SEM system 300 previously described in FIG. 3 or a stand-alone computer. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 400 shown in FIG. 4 may be embodied as a plurality of computing entities, tools, and/or the like operating collectively to perform one or more processes, methods, and/or steps. As just one non-limiting example, the computing entity 400 may comprise a plurality of individual data tools, each of which may perform specified tasks and/or processes.

Depending on the embodiment, the computing entity 400 may include one or more network and/or communications interfaces 425 for communicating with various computing entities, such as by communicating data, content, information, and/or similar terms used herein interchangeably that can be transmitted, received, operated on, processed, displayed, stored, and/or the like. Thus, in certain embodiments, the computing entity 400 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 400 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 400 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 400 includes or is in communication with one or more processing elements 410 (also referred to as processors, processing circuitry, and/or similar terms used herein interchangeably) that communicate with other elements within the computing entity 400 via a bus 430, for example, or network connection. As will be understood, the processing element 410 may be embodied in several different ways. For example, the processing element 410 may be embodied as one or more complex programmable logic devices (CPLDs), microprocessors, multi-core processors, coprocessing entities, application-specific instruction-set processors (ASIPs), and/or controllers. Further, the processing element 410 may be embodied as one or more other processing devices or circuitry. The term circuitry may refer to an entirely hardware embodiment or a combination of hardware and computer program products. Thus, the processing element 410 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 410 may be configured for a particular use or configured to execute instructions stored in volatile or non-volatile media or otherwise accessible to the processing element 410. As such, whether configured by hardware, computer program products, or a combination thereof, the processing element 410 may be capable of performing steps or operations according to embodiments of the present invention when configured accordingly.

In various embodiments, the computing entity 400 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 420 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 420 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the memory media 420 may also be embodied as a data storage device or devices, as a separate database server or servers, or as a combination of data storage devices and separate database servers. Further, in some embodiments, the memory media 420 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the invention may be stored.

In various embodiments, the computing entity 400 may further include or be in communication with volatile media (also referred to as volatile storage, memory, memory storage, memory circuitry and/or similar terms used herein interchangeably). For instance, the volatile storage or memory may also include one or more volatile storage or memory media 415 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 415 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 410. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 400 with the assistance of the processing element 410 and operating system.

As will be appreciated, one or more of the computing entity's components may be located remotely from other computing entity components, such as in a distributed system. Furthermore, one or more of the components may be aggregated and additional components performing functions described herein may be included in the computing entity 400. Thus, the computing entity 400 can be adapted to accommodate a variety of needs and circumstances.

Exemplary System Operation

The functionality described herein may be carried out on a computing entity 400 as described herein. Accordingly, the computing entity 400 may carry out the functionality as logical operations and these logical operations may be implemented (1) as a sequence of computer implemented acts or one or more program modules running on the computing entity and/or (2) as interconnected machine logic circuits or circuit modules within the computing entity. The implementation is a matter of choice dependent on the performance and other requirements of the computing entity 400. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Extraction Module

Various embodiments of the disclosure provided herein accomplish the extraction of cell boundaries to identify standard cells by encoding the contacts into a feature vector and looking for unique patterns in them. In a typical imaging modality used in RE, such as an SEM, the image contrast for metallic structures are much higher than non-metals. This can help in the extraction of features even on noisy low-quality images. For this reason, the contact layer representing electronic connections between a metal layer and other layers can be used in various embodiments for the standard library extraction due to its high image contrast.

Thus, turning now to FIG. 5, additional details are provided regarding a process flow for extracting standard cells to form a standard cell candidate library using raw multi-layered SEM images of an IC according to various embodiments. FIG. 5 is a flow diagram showing an extraction module for performing such functionality according to various embodiments of the invention. For example, depending on the embodiment, the extraction module can be implemented within a stand-alone system to an existing imaging modality (e.g., SEM), or integrated into an existing software framework of the imaging modality.

Here, the process flow 500 begins with the boundary extraction module receiving one or more raw multi-layered SEM images of an IC and extracts the raw contact layer SEM image found in the images in Operation 510. The boundary extraction module then binarizes the extracted raw contact layer SEM image to generate a binarized contact layer SEM image with low noise and high-quality. For instance, in particular embodiments, the boundary extraction module may carry out the binarization using a thresholding process that removes pixels having intensity values that are lower than an intensity threshold.

Turning briefly to FIG. 6, this figure provides an example of binarizing an extracted raw contact layer SEM image 610 to form a binarized raw contact layer SEM image 620 using a thresholding process in accordance with some embodiments. As shown in FIG. 6, a low noise and high quality image 620 is obtained based on applying the thresholding process to extract the contacts from the raw SEM image 610. In this example, any pixel having intensity value less than 250 has been filtered out from the raw SEM image 610 to obtain the binarized image 620. As a result, contacts information on the contact layer may be clearly identified, including positions of a plurality of contact rows and a plurality of contact columns.

Returning to FIG. 5, the boundary extraction module continues with determining a plurality of $V_{cc}$ lines to extract a cell height in Operation 520. In various embodiments, the boundary extraction module determines the $V_{cc}$ lines by identifying contact rows having a periodic nature to be the $V_{cc}$ lines and then extracts the cell height as the distance between two adjacent $V_{cc}$ lines. For instance, it has been observed that there exists a minimum distance between two contacts on a $V_{cc}$ line and the distance between two $V_{cc}$ lines is always constant. Therefore, particular embodiments exploit this observation to localize $V_{cc}$ lines. Specifically, the boundary extraction module is configured in particular embodiments to extract the $V_{cc}$ lines from the image by initially measuring the distance between contacts in each row, calculating a median value for the corresponding row, and identifying the minimum value among the median values. The boundary extraction module then marks every row that has a median value equal to the minimum value to be a $V_{cc}$ line.

Turning briefly to FIG. 7, an example plot 700 is provided illustrating the periodic nature associated with the contact separation between $V_{cc}$ lines that can be observed. Since the separation between $V_{cc}$ lines can be taken as an integral multiple of an arbitrary integer, an arithmetic progression that best describes the periodic nature can be fitted to the plot 700. Thus, the common difference of the arithmetic progression can be used to define the cell height in the design. Therefore, turning to FIG. 8, an example of a binarized raw contact layer SEM image is shown with the Vcc lines 800 determined in accordance with various embodiments. Here, the boundary extraction module determines the $V_{cc}$ lines 800 based on the periodic nature of the contacts on the $V_{cc}$ lines, which are then used by the module to extract the cell height.

The process flow 500 continues with the boundary extraction module generating a feature vector for each contact column in Operation 530. The feature vector encodes distances between contacts of the contact column and a closest $V_{cc}$ line into feature elements. In some embodiments, the boundary extraction module may be configured to store the feature vectors and column distance values representing distances between two adjacent contact columns for determining cell boundaries in a later operation. FIG. 9 provides an example 900 of encoding a binarized raw contact layer SEM image into feature vectors in accordance with various embodiments.

There are generally two drawbacks to working on an image. The space/time complexity involved in going through the image and the noise introduced by the imaging modality. Here, the space-time complexity can be considerably reduced in various embodiments by encoding the image into simple numerical vectors. Thus, the boundary extraction module encodes each contact column in the acquired image into a numerical vector using the distance between each contact of the contact column and the $V_{cc}$ line. The distance between each contact of the contact column and the $V_{cc}$ line is denoted by "d" 910 in FIG. 9. For instance, the left contact column 940 in FIG. 9 has eight feature values indicating the distances between the centroid of each of its eight contacts and the centroid of the $V_{cc}$ line 950. The $V_{cc}$ line 950 can be found either on the contact layer or on metal 1 layer. Utilizing the $V_{cc}$ line 950 alleviates the misalignment to a certain extent, since the patterns are encoded using a local point of reference.

Following the encoding, every three adjacent contact columns in the image are extracted and saved along with the distances between them. This is depicted in FIG. 9 where the distance between the left column and the middle column is denoted by "d1" 920 and the distance between the middle column and the right column is denoted by "d2" 930. Even though the features are more unique with longer sequences of columns, the sequence of columns is limited to the count of three in this instance to ensure that standard cells having just one contact column can also be detected. However, the number of sequence of columns is not limited to three, and may be changed to any value in other embodiments. For instance, if the minimum number of columns in a cell in the standard cell library is known beforehand, then this parameter can be changed to that minimum number.

Returning to FIG. 5, the process flow 500 continues with the boundary extraction module applying a model rules set to analyze the stored feature vectors and column distance values at Operation 540 to detect cell boundaries at Operation 550 based on the result of applying the model rule set. For instance, in particular embodiments, the model rule set may include two rules, an inter-contact distance rule and a start-end rule. The inter-contact distance rule states that for any given cell, the distance between its respective contact columns is the same. For example, distances d1 920 and d2 930 denoted in FIG. 9 would be the same if the contact appears inside the cell. However, if the columns appear on the boundary of the cell, the distance varies randomly. The information in this rule is captured by the feature encoding.

The start-end rule states the ending boundary of one cell is always followed by the starting boundary of another cell. A contact column that does not belong to a cell cannot exist. Any detected boundary that does not satisfy this rule is ignored. Since most imaging modalities used in RE captures the IC layers in smaller images and stitches them together to form a mosaic, there are concerns for the detection of partial cells in the contact layer. This problem is resolved by the start-end rule, since partial cells have either a beginning or an end and not both. Partial cells detected at the edges of the image can be ignored or flagged for further processing later.

Finally, the boundary extraction module extracts the standard cells in Operation 560 based on the cell boundaries determined at Operation 550 and stores the standard cells to a standard cell candidate library. In particular embodiments, the boundary extraction module may be configured to perform segmentation. Specifically, with the application of the start-end rule and presence of noise in the image, some under-segmentation of the cell might have occurred. To remedy this, the boundary extraction module may compare the cells against each other. If a given cell can be expressed as the sum of a number of n cells present in the library in any given order, then the boundary extraction module may segment them into a combination of n cells.

Case Study Involving Exemplary Embodiments

A case study is now discussed with respect to use of various embodiments of the disclosure. Here, embodiments are used to reproduce two industry-use standard libraries: 32/28 nm Educational Design Kit and Synopsys open educational design. These libraries contain 350 and 340 standard cells corresponding to 32 nm and 90 nm node technologies respectively. Using the two libraries, an Advance Encryption Standard (AES) design was synthesized into approximately 10,000 standard cells to be extracted to form the contact layer as a segmented image. A small section of the verification setting on the 32 nm dataset and the 90 nm dataset are shown in FIG. 10. Specifically, FIG. 10 illustrates examples of binarized PO layer SEM images extracted from the 32 nm dataset 1010 and the 90 nm dataset 1020.

FIG. 11 illustrates standard cells extracted from the AES design image in accordance with various embodiments of the present disclosure. As shown in FIG. 11, each extracted standard cell is separated by cell boundaries 1100 that have been detected. Table 1 summarizes the results of the experiment. In Table 1, True Match corresponds to the extraction of the complete cell when compared to ground truth. Partial Matches happen when compound cells are detected. A compound cell is a combination of multiple ground truth cells. Failed Matches happen when the detected cells are over segmented versions of the ground truth cells.

TABLE 1

Summary of the results from case study

| | 32 nm | 90 nm |
|---|---|---|
| Node Technology | | |
| No. of Unique Cells | 64 | 87 |
| True Match | 60 (94%) | 27 (31%) |
| Partial Match | 0 (0%) | 33 (38%) |
| Failed Match | 4 (6%) | 27 (31%) |

As observed in Table 1, there is a significant deviation between the cell extraction of the 32 nm and 90 nm node technologies. The reason for this discrepancy can be explained in FIG. 12. FIG. 12 illustrates examples of a non-grid-like allocation of contacts on the 90 nm dataset 1210 and a grid-like allocation of contacts on the 32 nm dataset 1220. The segmentation and extraction of cells solely depend on the encoded features. Since the AES design is based at least in part on the 90 nm node technology that does not follow a grid-like arrangement of contacts, it is difficult to encode them into a discretized feature space. Depending on the noise in the image, a floating contact, e.g., the contact 1230 shown overlapping with the square box, can be either included in the current contact column or one of the adjacent contact columns. This uncertainty in its absolute position causes the encoding to change at times. Although inconvenient, the encoding is necessary in various embodiments to reduce complexity and enable such embodiments to scale to present day billion transistor ICs.

Accordingly the partial and failed matches are caused either due to over-segmentation or under-segmentation of standard cells. In the AES design, there were situations where two standard cells always occurred together. With the lack of variance in distance measures for the encoded features for that specific standard cell, they were grouped together causing a partial match. Segmentation of a cell only happens when evidence of variation in distance in feature encoding is detected, e.g., when d1 920 and d2 930 denoted in FIG. 9 is detected as different.

FIG. 13 illustrates an example of a failed match result due to over-segmentation. Failed matches occur when a subset of contact columns repeat across multiple standard cells. It can also happen due to variation in encoded features if the design 1210 does not follow a grid-like pattern, as shown in FIG. 12. Hence, explaining the higher rate of failed matches in the 90 nm AES design. FIG. 13 shows an instance of a failed match due to over-segmentation and the subset of contact columns 1310, 1320 repeat across multiple standard cells. This may be remedied by a better feature encoding. However, since most of the advanced node technology IC follows a strict grid-like arrangement in their contact layer, various embodiments of the disclosure can be utilized to extract the standard cell library at a high success rate.

Application of Embodiments to a Real-World Example

Embodiments of the disclosure are now discussed with respect to their application to a real-world sample to demonstrate their effectiveness. The SEM image of the contact layer is acquired by delayering the multi-layer SEM images associated with an IC as previously described. FIG. 14 illustrates an example raw contact layer SEM image 1400 acquired at high potential (12 kV) with window size of 100 μm and dwelling time of 32 μs/pixel.

Accordingly, the image is binarized using a thresholding method as previously described. FIG. 15 illustrates an example binarized contact layer SEM image 1500 using a thresholding method. Here, the threshold pixel intensity value has be set at 225. Any pixel in the original image with an intensity value that meets or exceeds 225 is saved as a contact. The rest of the pixels are set to zero.

$V_{cc}$ supply lines are detected as described herein and to extract contact layer image strips from the binarized contact layer image. FIG. 16 illustrates a plurality of binarized contact layer SEM image strips 1600. Each extracted contact layer image strip includes a plurality of contact rows and a plurality of contact columns. The strip size can also be used in particular embodiments for standardization of extracted features.

Finally, feature vector encoding is generated for each column and a model rule set is applied to the feature vector encoding for each contact layer image strip as described herein to extract standard cells. Some of the extracted cells with different cell types 1700 are shown in FIG. 17. Accordingly, these extracted cells 1710 can then be used to be decoded 1720 to recover their original functionalities 1730.

CONCLUSION

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. A computer-implemented method for automatically extracting one or more standard cells of an integrated circuit ("IC") using raw multi-layered images of the IC acquired using an imaging modality, the method comprising:
    extracting a raw contact layer image from the raw multi-layered images;
    binarizing the raw contact layer image to generate a binarized contact layer SEM image displaying a plurality of contacts forming a plurality of contact rows and a plurality of contact columns, in which each contact of the plurality of contacts represents an electronic connection between a metal layer and one of a poly-silicon layer or an active layer of the IC;
    determining a plurality of common collector supply voltage ("$V_{cc}$") lines based at least in part on a contact row subset of the plurality of contact rows, wherein each contact row of the contact row subset comprises a periodic nature of contacts and each two adjacent contact rows comprises a constant distance representing as a cell height;
    extracting a plurality of binarized contact layer image strips from the binarized contact layer image based at least in part on the plurality of $V_{cc}$ lines and the cell height; and
    for each binarized contact layer image strip,
        generating a plurality of feature vectors, each feature vector generated for a respective contact column located on the binarized contact layer image strip, wherein each feature vector comprises elements representing distances between contacts of the respective contact column and a closest $V_{cc}$ line associated with the binarized contact layer image strip;
        determining a plurality of column distance values, each column distance value representing a distance between each two adjacent contact columns located on the binarized contact layer image strip;
        determining cell boundaries based at least in part on the plurality of feature vectors, the plurality of column distance values, and a model rule set; and
        extracting the one or more standard cells based at least in part on the cell boundaries.

2. The computer-implemented method of claim 1 further comprising storing the one or more extracted standards cells in a standard cell candidate library.

3. The computer-implemented method of claim 2 further comprising:
    comparing at least one of the one more extracted standard cells with one or more standard cells stored in the standard cell candidate library; and
    in response to the at least one of the one or more extracted standard cells can be represented by a combination of standard cells stored in the standard cell candidate library, segmenting the at least one of the one more extracted standard cells into the combination of standard cells.

4. The computer-implemented method of claim 1, wherein the raw multi-layered images are acquired using a scanning electron microscope.

5. The computer-implemented method of claim 1, wherein binarizing the raw contact layer image to generate the binarized contact layer image is based at least in part on:
 determining a pixel intensity value for each pixel of the raw contact layer image; and
 removing the respective pixel from the raw contact layer image in response to the pixel intensity value being less than a pixel intensity threshold.

6. The computer-implemented method of claim 1, wherein determining the plurality of $V_{cc}$ lines based at least in part on the contact row subset of the plurality of contact rows further comprises:
 computing a median value for each contact row of the plurality of contact rows based at least in part on distances between two adjacent contacts located on the contact row;
 determining a minimum value among each of the median values associated with the plurality of contact rows;
 generating the contact row subset based at least in part on selecting contact rows in which the median value for each of the selected contact rows is equal to the minimum value; and
 determining the plurality of $V_{cc}$ lines based at least in part on the contact row subset.

7. The computer-implemented method of claim 1, wherein the model rule set comprises at least one of an inter-contact distance rule associated with determining cell boundaries based at least in part on comparing the plurality of column distance values to a constant column distance value and a start-end rule associated with determining cell boundaries based at least in part on ignoring or flagging partial cells detected near the determined cell boundaries.

8. An apparatus for automatically extracting one or more standard cells of an integrated circuit ("IC") using raw multi-layered images of the IC acquired using an imaging modality, the apparatus comprising at least one processor and at least one non-transitory memory including program code, the at least one non-transitory memory and the program code configured to, with the processor, cause the apparatus to at least:
 extract a raw contact layer image from the raw multi-layered images;
 binarize the raw contact layer image to generate a binarized contact layer SEM image displaying a plurality of contacts forming a plurality of contact rows and a plurality of contact columns, in which each contact of the plurality of contacts represents an electronic connection between a metal layer and one of a poly-silicon layer or an active layer of the IC;
 determine a plurality of common collector supply voltage ("$V_{cc}$") lines based at least in part on a contact row subset of the plurality of contact rows, wherein each contact row of the contact row subset comprises a periodic nature of contacts and each two adjacent contact rows comprises a constant distance representing as a cell height;
 extract a plurality of binarized contact layer image strips from the binarized contact layer image based at least in part on the plurality of $V_{cc}$ lines and the cell height; and
 for each binarized contact layer image strip,
  generate a plurality of feature vectors, each feature vector generated for a respective contact column located on the binarized contact layer image strip, wherein each feature vector comprises elements representing distances between contacts of the respective contact column and a closest $V_{cc}$ line associated with the binarized contact layer image strip;
  determine a plurality of column distance values, each column distance value representing a distance between each two adjacent contact columns located on the binarized contact layer image strip;
  determine cell boundaries based at least in part on the plurality of feature vectors, the plurality of column distance values, and a model rule set; and
 extract the one or more standard cells based at least in part on the cell boundaries.

9. The apparatus of claim 8, wherein the at least one non-transitory memory and the program code are configured to, with the at least one processor, cause the apparatus to store the one or more extracted standards cells in a standard cell candidate library.

10. The apparatus of claim 9, wherein the at least one non-transitory memory and the program code are configured to, with the at least one processor, cause the apparatus to:
 compare at least one of the one more extracted standard cells with one or more standard cells stored in the standard cell candidate library; and
 in response to the at least one of the one or more extracted standard cells can be represented by a combination of standard cells stored in the standard cell candidate library, segment the at least one of the one more extracted standard cells into the combination of standard cells.

11. The apparatus of claim 8, wherein the raw multi-layered images are acquired using a scanning electron microscope.

12. The apparatus of claim 8, wherein the at least one non-transitory memory and the program code are configured to, with the at least one processor, cause the apparatus to binarize the raw contact layer image to generate the binarized contact layer image by:
 determining a pixel intensity value for each pixel of the raw contact layer image; and
 removing the respective pixel from the raw contact layer image in response to the pixel intensity value being less than a pixel intensity threshold.

13. The apparatus of claim 8, wherein the at least one non-transitory memory and the program code are configured to, with the at least one processor, cause the apparatus to determine the plurality of $V_{cc}$ lines based at least in part on the contact row subset of the plurality of contact rows by:
 computing a median value for each contact row of the plurality of contact rows based at least in part on distances between two adjacent contacts located on the contact row;
 determining a minimum value among each of the median values associated with the plurality of contact rows;
 generating the contact row subset based at least in part on selecting contact rows in which the median value for each of the selected contact rows is equal to the minimum value; and
 determining the plurality of $V_{cc}$ lines based at least in part on the contact row subset.

14. The apparatus of claim 8, wherein the model rule set comprises at least one of an inter-contact distance rule associated with determining cell boundaries based at least in part on comparing the plurality of column distance values to a constant column distance value and a start-end rule associated with determining cell boundaries based at least in part on ignoring or flagging partial cells detected near the determined cell boundaries.

15. A non-transitory computer storage medium comprising instructions for automatically extracting one or more standard cells of an integrated circuit ("IC") using raw multi-layered images of the IC acquired using an imaging modality, the instructions being configured to cause one or more processors to at least perform operations configured to:

extract a raw contact layer image from the raw multi-layered images;

binarize the raw contact layer image to generate a binarized contact layer SEM image displaying a plurality of contacts forming a plurality of contact rows and a plurality of contact columns, in which each contact of the plurality of contacts represents an electronic connection between a metal layer and one of a poly-silicon layer or an active layer of the IC;

determine a plurality of common collector supply voltage ("$V_{cc}$") lines based at least in part on a contact row subset of the plurality of contact rows, wherein each contact row of the contact row subset comprises a periodic nature of contacts and each two adjacent contact rows comprises a constant distance representing as a cell height;

extract a plurality of binarized contact layer image strips from the binarized contact layer image based at least in part on the plurality of $V_{cc}$ lines and the cell height; and for each binarized contact layer image strip, generate a plurality of feature vectors, each feature vector generated for a respective contact column located on the binarized contact layer image strip, wherein each feature vector comprises elements representing distances between contacts of the respective contact column and a closest $V_{cc}$ line associated with the binarized contact layer image strip;

determine a plurality of column distance values, each column distance value representing a distance between each two adjacent contact columns located on the binarized contact layer image strip;

determine cell boundaries based at least in part on the plurality of feature vectors, the plurality of column distance values, and a model rule set; and extract the one or more standard cells based at least in part on the cell boundaries.

16. The non-transitory computer storage medium of claim 15, wherein the instructions are further configured to cause the one or more processors to at least perform operations configured to store the one or more extracted standards cells in a standard cell candidate library.

17. The non-transitory computer storage medium of claim 16, wherein the instructions are further configured to cause the one or more processors to at least perform operations configured to:

compare at least one of the one more extracted standard cells with one or more standard cells stored in the standard cell candidate library; and in response to the at least one of the one or more extracted standard cells can be represented by a combination of standard cells stored in the standard cell candidate library, segment the at least one of the one more extracted standard cells into the combination of standard cells.

18. The non-transitory computer storage medium of claim 15, wherein the raw multi-layered images are acquired using a scanning electron microscope.

19. The non-transitory computer storage medium of claim 15, wherein the instructions are configured to cause the one or more processors to at least perform operations configured to binarize the raw contact layer image to generate the binarized contact layer image by:

determining a pixel intensity value for each pixel of the raw contact layer image; and removing the respective pixel from the raw contact layer image in response to the pixel intensity value being less than a pixel intensity threshold.

20. The non-transitory computer storage medium of claim 15, wherein the instructions are further configured to cause the one or more processors to at least perform operations configured to determine the plurality of $V_{cc}$ lines based at least in part on the contact row subset of the plurality of contact rows by:

computing a median value for each contact row of the plurality of contact rows based at least in part on distances between two adjacent contacts located on the contact row;

determining a minimum value among each of the median values associated with the plurality of contact rows;

generating the contact row subset based at least in part on selecting contact rows in which the median value for each of the selected contact rows is equal to the minimum value; and determining the plurality of $V_{cc}$ lines based at least in part on the contact row subset.

21. The non-transitory computer storage medium of claim 15, wherein the model rule set comprises at least one of an inter-contact distance rule associated with determining cell boundaries based at least in part on comparing the plurality of column distance values to a constant column distance value and a start-end rule associated with determining cell boundaries based at least in part on ignoring or flagging partial cells detected near the determined cell boundaries.

* * * * *